(12) United States Patent
Walters et al.

(10) Patent No.: US 8,833,608 B2
(45) Date of Patent: Sep. 16, 2014

(54) ARTICULATING AIR-BLAST SYSTEM AND METHOD FOR INITIATING FLOW OF BULK MATERIALS IN CONTAINMENT VESSELS

(71) Applicants: Mark Larry Walters, Lake Crystal, MN (US); Terry Dale Pankratz, St. Peter, MN (US); Gregory Wallace Nelson, Mankato, MN (US)

(72) Inventors: Mark Larry Walters, Lake Crystal, MN (US); Terry Dale Pankratz, St. Peter, MN (US); Gregory Wallace Nelson, Mankato, MN (US)

(73) Assignee: Pneumat Systems, Inc., Mankato, MN (US)

( * ) Notice: Subject to any disclaimer, the term of this patent is extended or adjusted under 35 U.S.C. 154(b) by 0 days.

(21) Appl. No.: 13/675,656

(22) Filed: Nov. 13, 2012

(65) Prior Publication Data

US 2014/0134006 A1    May 15, 2014

(51) Int. Cl.
*G01F 11/00* (2006.01)
*B60P 1/60* (2006.01)

(52) U.S. Cl.
CPC .................................. *B60P 1/60* (2013.01)
USPC ............... 222/1; 222/52; 222/63; 222/195; 222/333

(58) Field of Classification Search
USPC .............. 222/1, 52, 53, 63, 152, 195, 333
See application file for complete search history.

(56) References Cited

U.S. PATENT DOCUMENTS

| 6,702,248 B2 | 3/2004 | Treat |
| 7,470,082 B2 * | 12/2008 | Lloyd ............................. 404/85 |
| 7,644,523 B2 * | 1/2010 | Buckner ........................ 37/304 |

OTHER PUBLICATIONS

NPK Construction Equipment, Inc., Hard Car Unloader, www.railcarunloader.com, pp. 1-2, 2008.
Sarka Conveyor & Automation, The Carhoe, www.sarkaconveyors.com/carhoe.htm, pp. 1-2, 2002.

* cited by examiner

*Primary Examiner* — Frederick C Nicolas
(74) *Attorney, Agent, or Firm* — Sapientia Law Group PLLC; Jeffrey C. Brown, Esq.

(57) ABSTRACT

A system and method to facilitate the unloading of bulk materials from containment vessels and transport vehicles, including non-flowing DDGs in such vehicles, is disclosed. The system includes a compressed air system that further includes a motor, an air compressor, and an air reservoir; a hydraulic fluid system that further includes a motor, a hydraulic fluid reservoir, and a pump; a wireless control system; a slew drive; a hydraulically-powered, articulating boom arm that also includes hydraulic cylinders that remain in a plane parallel to the boom arm throughout operation of the system; and a blaster assembly with first and second ends that includes an air reservoir proximate the first end, a mount assembly, a discharge tube assembly, and a discharge tip assembly that includes a shooting valve proximate the second end.

16 Claims, 8 Drawing Sheets

ARTICULATING AIR-BLAST SYSTEM AND METHOD FOR INITIATING FLOW OF BULK MATERIALS IN CONTAINMENT VESSELS

BACKGROUND OF THE INVENTION

1. Field of the Invention

The present invention relates to systems and methods for initiating flow of bulk materials in containment vessels, including transport vessels like trucks and hopper railcars.

2. Background

Bulk materials, like distillers grains for example, often are transported in containment vessels like trucks and hopper railcars. Distillers grains are a useful, fine-grain material byproduct of using corn, wheat, barley, and other grains in fermentation processes, like breweries and ethanol plants. Distillers grains can be "wet" or "dry." Because of their high moisture content (up to 70% moisture) and the microbial growth such environments encourage, wet distillers grains have a relatively short shelf-life. Dry distillers grains ("DDGs"), on the other hand, have low moisture content (about 10-12% moisture) and can be stored for much longer periods without significant contamination. Although, DDGs are a byproduct, DDGs are readily marketable nonetheless as animal feed and, therefore, are frequently transported long distances in trucks and railcars.

3. Description of the Prior Art

A typical DDG transport vehicle is a covered "hopper" railcar. A hopper car is a type of railroad freight car used to transport loose bulk commodities such as coal, ore, grain, track ballast, and the like. This type of railcar is distinguished from a gondola car in that it has gravity discharge gates on the underside (belly-dump) or on the sides to discharge its cargo. Covered hopper cars are used for bulk cargo that must be protected from the elements, such as grain, sugar, and fertilizer. Hopper railcars typically have three, divided compartments, each compartment having its own belly-dump aperture or gate.

In such railcar systems, transported DDGs tend to settle and cake during transport as a result of horizontal and vertical compression, and heat and humidity, which prevents the material from being easily unloaded through the gravity discharge gates. Consequently, bulk materials that have become settled and caked during transport no longer flow freely through the gravity discharge gates and it takes significant time to unload such materials.

In order to loosen settled, caked, or hung-up material to initiate flow through the discharge gates, mechanical techniques are often employed and have proven to be either very time and labor intensive or damaging to the hopper car itself. These methods include shakers, vibrators, air lances, air cannons and mechanical probes or scrapers. Often a combination of methods is employed such as vibrating the car and striking the sides of the railcar with sledgehammers to try to dislodge the settled or hung-up material. The prior art also includes backhoe-style arm systems that attempt to scrape product out of the railcar with brute force, often resulting in damage to the railcar itself. Air cannon systems have also been used to try to loosen bulk materials but with limited results due to limitations of placement and actuation. Under these circumstances, it may take days to unload a single railcar using the approaches of the prior art.

Thus, there is a need for a system that can significantly reduce the time to unload bulk materials from containment vessels and transport vehicles like railcars and trucks. The disclosure herein accomplishes that objective by allowing an operator of the system to quickly and accurately position a blast of compressed air at points throughout the containment vessel to efficiently dislodge and initiate the flow of bulk particulate material from the vessel.

BRIEF SUMMARY OF THE INVENTION

The system and method disclosed herein are designed to facilitate the unloading of bulk commodities like non-flowing DDGs from containment vessels, including transport vehicles. The system comprises a slew drive; a hydraulic, articulating arm; a mount assembly; and a blaster assembly with first and second ends and comprising an air reservoir proximate the first end, a discharge tube assembly, and a discharge tip assembly further comprising a shooting valve proximate the second end. The discharge tube and tip assemblies combine to form a lancing probe.

The system and method are so designed to allow an operator of the system to accurately place a blast of highly pressurized air from the discharge tip assembly into or onto the bulk material to fluidize and initiate flow of the bulk material through the belly-dump aperture of a hopper railcar or other transport vehicle or containment vessel. Accurate placement of the discharge tip assembly is effected by at least one hydraulically powered boom arm that can be extended and maneuvered to accurately position the lancing probe in the bulk material. A plurality of such boom arms may also be employed. The entire system can be mounted to a mobile structure that can be maneuvered over the containment vessel or railcar, or the system can be permanently mounted in place. The air-blasting component of the system is similarly functional to an air cannon, except that the discharge tip assembly includes a shooting valve (shuttle valve) positioned at the second end of the discharge tube assembly instead of proximate the air tank or reservoir at the first end of the discharge tube assembly. With the shooting valve positioned at the discharge end, the discharge tube assembly serves as a fully-pressurized extension of the air reservoir that holds the air pressure until it is actuated to quickly release and powerfully blast compressed air into or onto the bulk material.

To implement the system to initiate flow of non-flowing bulk materials in a containment vessel, an operator may maneuver the lancing probe through the top of the vessel and the bulk material until the discharge tip assembly of the lancing probe is located near the gravity-discharge opening of the vessel. The slew drive, articulating arm, and mount assembly of the system provide the operator with effective, three-dimensional movement to accurately position the lancing probe at the desired point. Once in position, the shooting valve is actuated to release the compressed air out the reservoir and discharge tube assembly through the open shooting valve and into the discharge tip assembly. The air blast fluidizes the bulk material and compels it to flow out the containment vessel or transport vehicle. With the use of a wireless remote control, the operator can move about the containment vessel about to get clear or better lines of sight to maneuver the boom arm and lancing probe to the desired location by actuating the boom arm's single-plane hydraulic system and/or rotating the slew drive to place the lancing probe anywhere in the containment vessel or transport vehicle to blast bulk material so it flows out the vessel or vehicle.

By reason of accurate placement of the air blast point and less friction loss by positioning the shooting valve at the tip of the lancing probe instead of proximate the air reservoir, the system and method disclosed herein significantly decrease the amount of time to unload containment vessels.

DESCRIPTION OF THE DRAWINGS

The invention can be better understood by reference to the following drawings, wherein.

DETAILED DESCRIPTION

In the following detailed description, reference is made to the accompanying drawings that form a part hereof, and in which are shown by way of illustration specific embodiments or examples. These embodiments may be combined, other embodiments may be utilized, and structural, logical, and procedural changes may be made without departing from the spirit and scope of the present invention. The following detailed description is, therefore, not to be taken in a limiting sense, and the scope of the present invention is defined by the appended claims and their equivalents.

Figure 1:
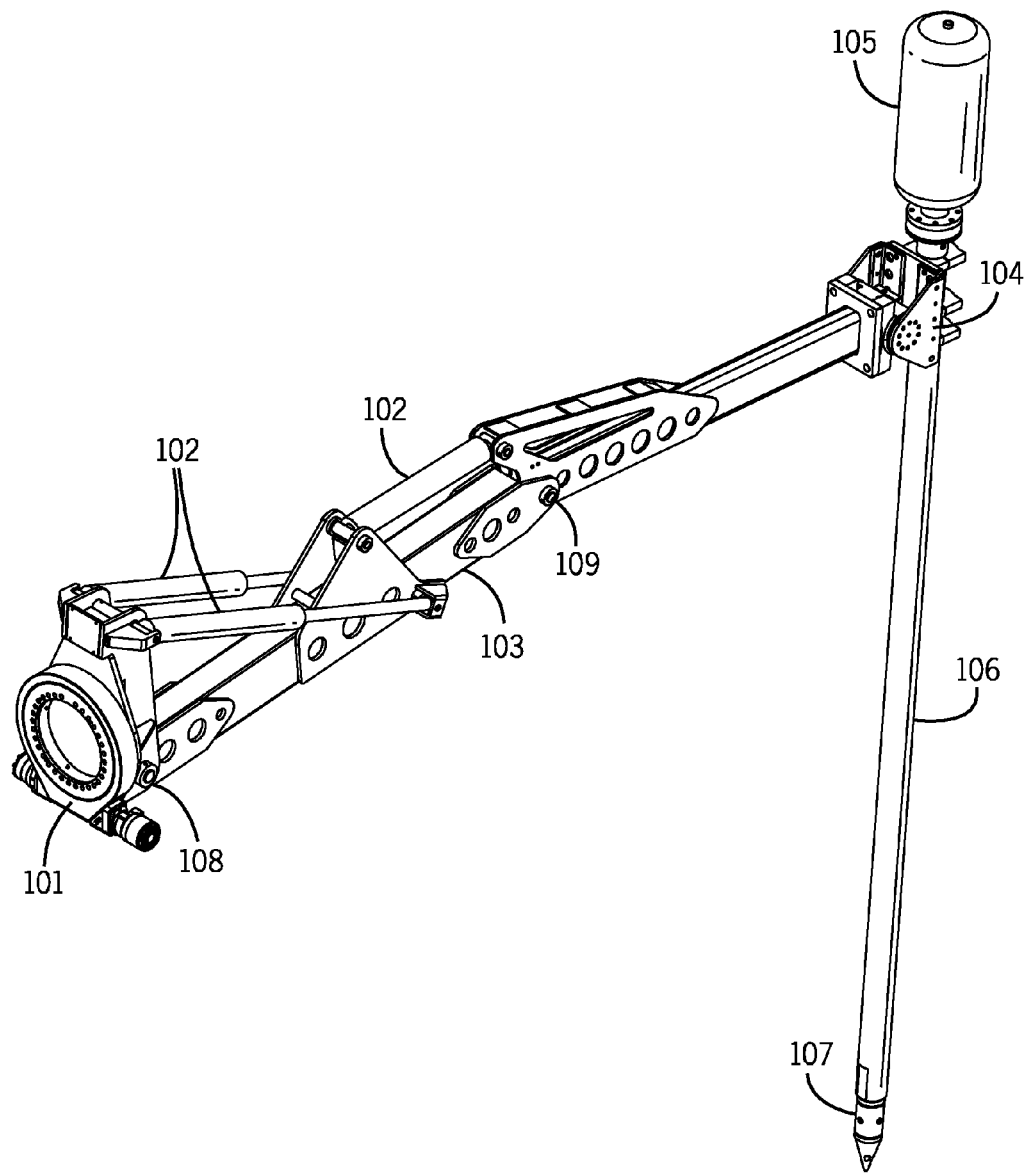
FIG. 1 is a perspective view of an embodiment of the system for initiating flow of bulk materials in containment vessels.
Figure 2:
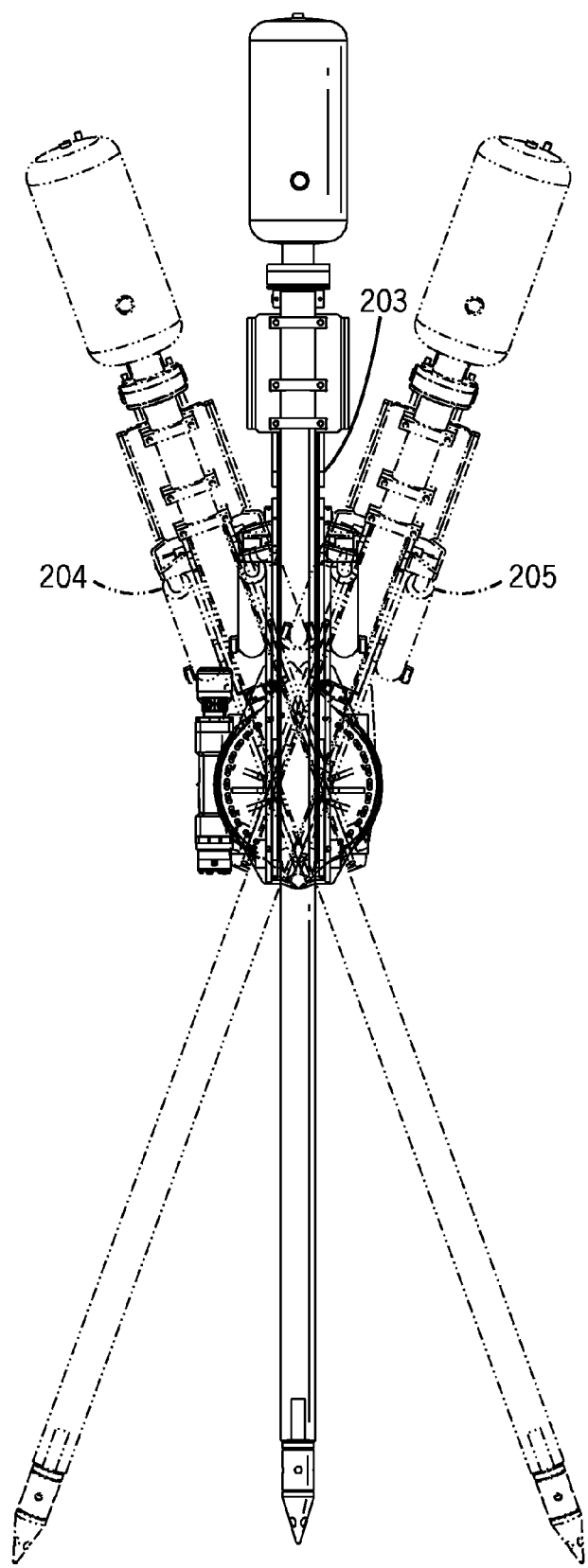
FIG. 2 is an end view of an embodiment of the system for initiating flow of bulk materials in containment vessels.

As disclosed in FIG. 1, an embodiment of the system and method includes slew drive 101, hydraulic cylinders 102, articulable boom arm 103, mount assembly 104, air reservoir 105, discharge tube assembly 106, and discharge tip assembly 107. The slew drive 101 is adjacent a mountable end of the hydraulically-powered boom arm 103. In this embodiment, the slew drive 101 is rotatable to about 20° in each direction (40° total) from vertical as illustrated in FIG. 2, thereby allowing the plane of the boom arm 103 to rotate accordingly. Slew drive 101 is further configured to include stop levers and a stop pin that together operate to deactivate further movement of the slew drive to prevent it from rotating more than about 20° from vertical so that torsional strain on the boom arm and blaster assembly are minimized. FIG. 1 also discloses the hydraulically-powered boom arm 103 articulable at two points 108 109 along the length of the arm 103 as disclosed in FIG. 3 to allow a range of motion of arm 103 as disclosed in FIG. 3. FIG. 1 also discloses mount assembly 104 proximate air reservoir 105. Mount assembly 104 is hydraulically actuated to allow further articulation of the discharge tube and tip 106 107 as disclosed in FIG. 3. In another embodiment, mount assembly 104 comprises a hydraulically powered rotary actuator. In a further embodiment, mount assembly 104 comprises a pivot point wherein another hydraulic cylinder is connected to the distal end of the boom arm and the first end of the blaster assembly (collectively 105 106 107) to rotate the blaster assembly around the pivot point to provide operational arcs 312 and positions 313 315 of discharge tip 307. Thus, an operator of the system utilizing both arm 103 and mount assembly 104 can accurately position the discharge tip at a desired location in the containment vessel. As further disclosed in FIG. 1, the hydraulic cylinders 102 that power the boom arm's articulating movement at point 108 near slew drive 101 and point 109 about midway the length of boom arm 103, are in a plane parallel to boom arm 103. FIG. 2 discloses the singular, longitudinal plane of the hydraulically-powered boom arm 203. Consequently, the hydraulic cylinders 102 of boom arm 103 remain in a parallel plane even when slew drive 101 is rotated. This allows the lancing probe (collectively 106 and 107) to be driven into the bulk material in-line with all the hydraulic cylinders with no twisting or off-axis forces, which results in positive controllable positioning capabilities that dramatically reduce the potential of damage to the containment vessel and the system itself.

Figure 3:
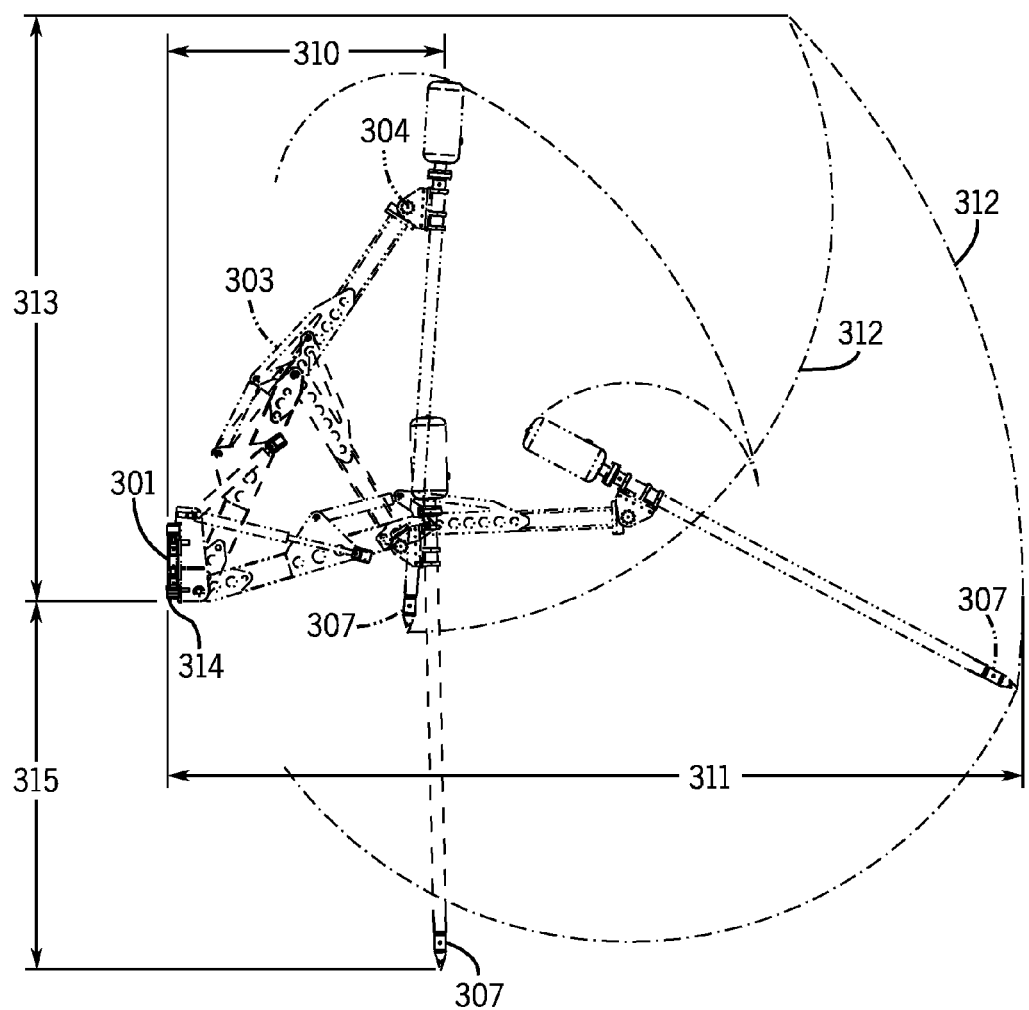
FIG. 3 is a side view of the range of motion of an embodiment of the system for initiating flow of bulk materials in containment vessels.

As briefly discussed above, FIG. 3 discloses that an operator of the system utilizing both boom arm 303 and rotatable mount assembly 304 can accurately position the discharge tip 307 from as close to about 8 feet 310 from the relative position of the slew drive 301 to about 28 feet 311 from the relative position of the slew drive 301. FIG. 3 further discloses the arcs 312 of the discharge tip 307 in a single plane. Thus, the discharge tip 307 can be positioned at a point about 20 feet higher 313 than the relative position of the bottom of the slew drive 314 and about 15 feet lower 315 than the relative position of the bottom of the slew drive 314. When the slew drive 101 301 is rotated to its maximum angles, the discharge tip 107 307 can be effectively positioned in a hopper railcar or other transport vehicle. This range of motion of discharge tip 107 307 afforded by the rotatable movement of slew drive 101 301 and articulating movement of boom arm 303 (See FIG. 3) allows the operator to accurately position the discharge tip 107 307 to maximize the efficacy of the air blast in the bulk material to initiate flow of bulk material through the gravity discharge gates of the containment vessel or hopper railcar. In addition to DDGs, bulk materials might also include soybean meal, corn meal, gluten meal, blood meal, plastic, coal, salt, sugar, flour, silica, corn, wheat, soybeans, wheat middlings, feed, minerals, fertilizer, and gypsum.

Figure 4:
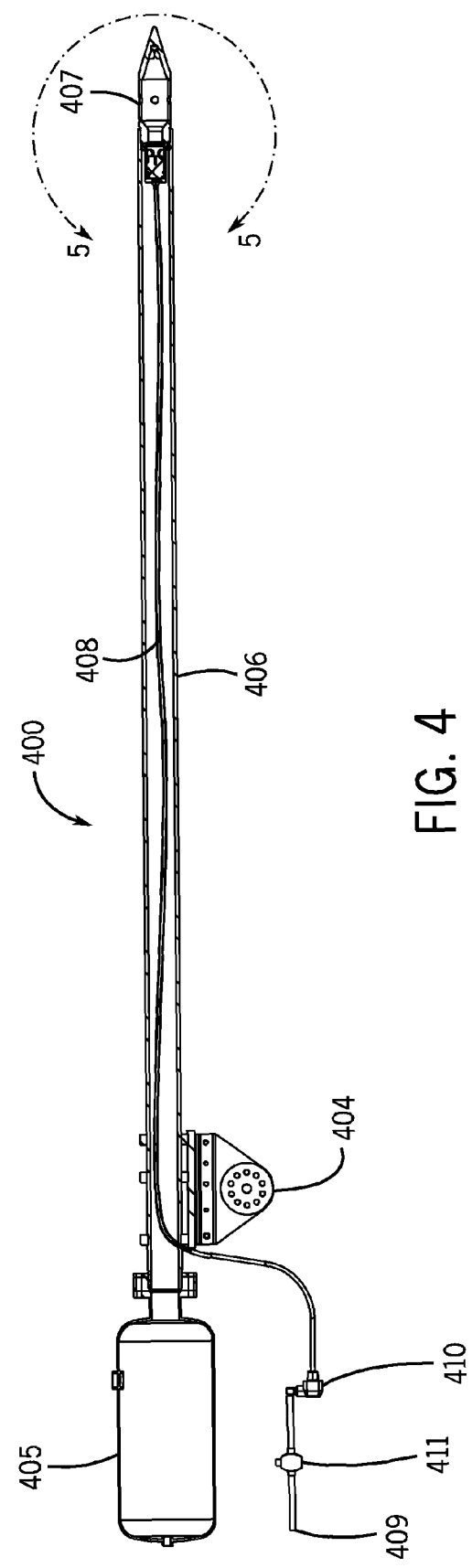
FIG. 4 is a side view of an embodiment of the blaster assembly of the system for initiating flow of bulk materials in containment vessels.

FIG. 4 discloses the details of the blaster assembly 400, which comprises air reservoir 405 proximate a first end of the blaster assembly, a rotatable mount assembly 404, a discharge tube assembly 406, and a discharge tip assembly 407 proximate a second end of the blaster assembly. As further disclosed in FIG. 4, discharge tip assembly 407 is positioned proximate the second end of blaster assembly so the lancing probe (collectively 406 and 407) itself contains pressurized air and effectively becomes part of the air reservoir 405. FIG. 4 also discloses compressed air conduit 408 in connectable engagement with opening 515 and air inlet 409. In one embodiment, a threaded air conduit connector perimeter 518 is mated to a threaded interior 520 of shooting valve opening 515. Conduit 408 508 also includes quick exhaust valve 410 and solenoid valve 411. This configuration is in contrast to typical air cannons that position a shuttle valve at the discharge end of the reservoir tank with a significant, unpressurized length of nozzle (or discharge assembly tube and tip in this case) attached thereafter. Unlike the present disclosure, an air cannon in the configuration where the shuttle valve is positioned at the discharge end of the air reservoir tank becomes a large friction-loss zone that scrubs off blast energy by lowering the blast pressure that exits out the cannon. In the embodiment disclosed herein, there is a negligible pressure drop at air discharge point 407 due to friction loss because full air pressure is contained within the entire length of the discharge assembly tube 406 right up to the piston 511 of shooting valve 509.

Figure 5:
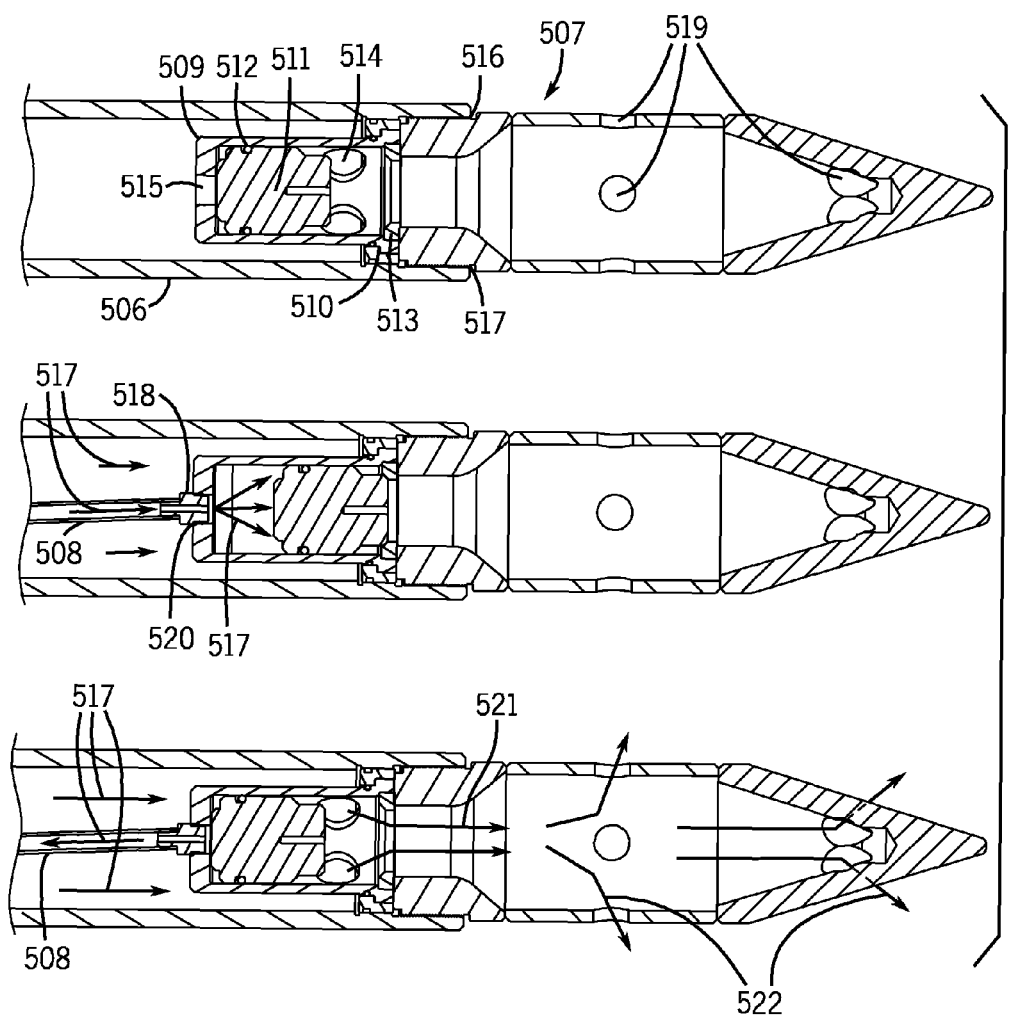
FIG. 5 is a cut away view of an embodiment of the shooting valve of the system for initiating flow of bulk materials in containment vessels.

As disclosed in FIG. 5, the discharge tip assembly 507 comprises a modified shuttle valve or shooting valve 509 further comprising O-ring 510, piston 511 including O-ring 512, piston seat 513, at least one aperture 514, and opening 515. Shooting valve 509 is sealingly engaged to discharge tube assembly 506 to prevent air from escaping the points of contact between shooting valve 509 and discharge assembly 506. Discharge tip assembly 507 is sealingly engaged with shooting valve 509 to prevent air from escaping the points of contact between shooting valve 509 and discharge tip 507. By way of non-limiting example only, the points of contact between shooting valve 509 and discharge tip 507 may include a threaded discharge tip perimeter 516 mated to a threaded interior 517 of shooting valve 509. As further disclosed in FIG. 5, discharge assembly tube 506 is adapted to receive pressurized air 517. Opening 515 is also adapted to receive pressurized air 517 through air conduit 508. When said air is compressed in opening 515 through air conduit 408 508, the compressed air pushes against piston 511, driving it away from opening 515 to rest under pressure against piston seat 513. O-ring 512 prevents pressurized air from escaping around the perimeter of piston 511 and helps keep piston 511 sealingly engaged with seat 513. The operator can actuate the solenoid valve 411 to close off the air supply from compressed air supply line 409 and open quick exhaust valve 410, which allows pressurized air in conduit 408 508 to escape to atmosphere resulting in a pressure drop and partial vacuum in conduit 408 508 and opening 515 of shooting valve 509. With significantly less pressure in opening 515 and behind piston 511, the fully pressurized air 517 in tube 506 to flows rapidly through apertures 514, which pushes against and moves piston 511 towards opening 515 and away from seat 513. When piston 511 is pushed away from seat 513, compressed air 521 enters discharge tip 507 and exits 522 discharge tip assembly apertures 519 to blast and fluidize non-flowing bulk material and initiate flow of said material through the gravity discharge of a containment vessel or railcar.

Figure 6:
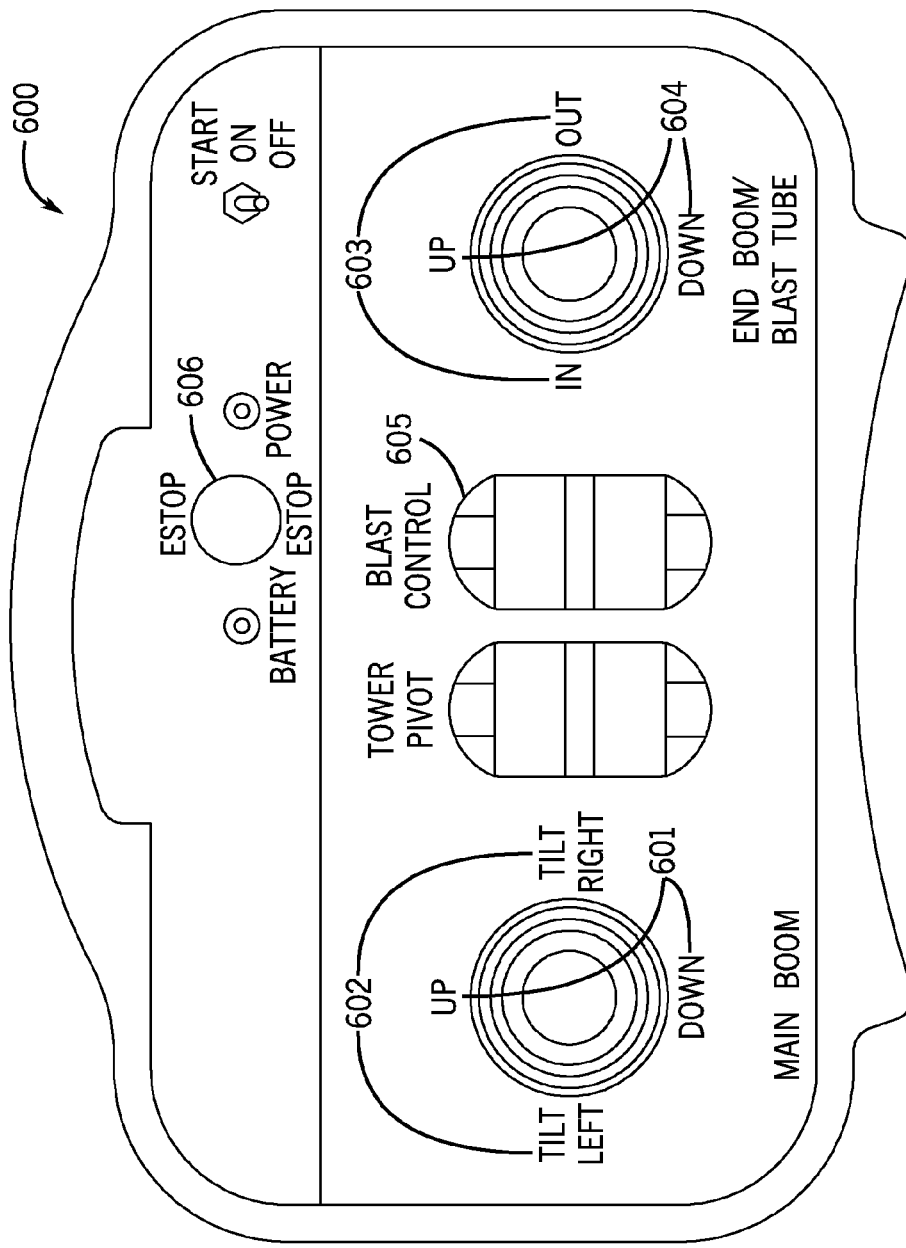
FIG. 6 is a top view of an embodiment of the wireless remote control of the system for initiating flow of bulk materials in containment vessels.

As disclosed in FIG. 6, the system also includes a wireless control system 600. The wireless control system 600 includes controls 601 for actuating hydraulic pistons 102, for left and right rotational movement 602 of the slew drive 101, and controls 603 for actuating hydraulic pistons 102 up and down. The wireless control system also includes controls 604 to actuate rotational movement of the mount assembly 104, which in turn rotates discharge tube assembly 106 around axis of mount assembly 304 to raise (up) and lower (down) discharge tip assembly 307 and discharge tube assembly 106 through arcs 312 as shown in FIG. 3. This allows an operator of the system to remotely control rotation of slew drive 101 and mount assembly 104, and articulation of boom arm 103. The wireless control system 600 also allows the operator to activate and control the compressed air blast. An operator uses trigger 605 to charge discharge tube assembly 106 and air conduit 408 with compressed air and actuate quick exhaust valve 410 to release compressed air from air conduit 408. As explained above, the rapid release of pressurized air from air conduit 408 causes a partial vacuum in the air conduit, which in turn causes piston 511 to move away from piston seat 513 and compressed air 521 522 to flow through shooting valve 509 and out discharge tip assembly 507. Wireless control system 600 further includes an emergency stop trigger 606 to stop hydraulic power and freeze movement of boom arm 103 and mount assembly 104 in case of emergency. In the embodiment including wireless control system 600, the operator is free to move about the containment vessel to obtain vantage points to place the lancing probe in areas of the containment vessel that might be visually inaccessible to an operator in a fixed position. Thus, by way of non-limiting example only, the operator of the embodiment of the system in use on a hopper railcar can move freely along the entire length of the top of the railcar to position the lancing probe in precise areas of the containment vessel that most effectively blast and fluidize non-flowing bulk material. The effective, operational radius of the wireless control system is about 50 feet.

Figure 7:
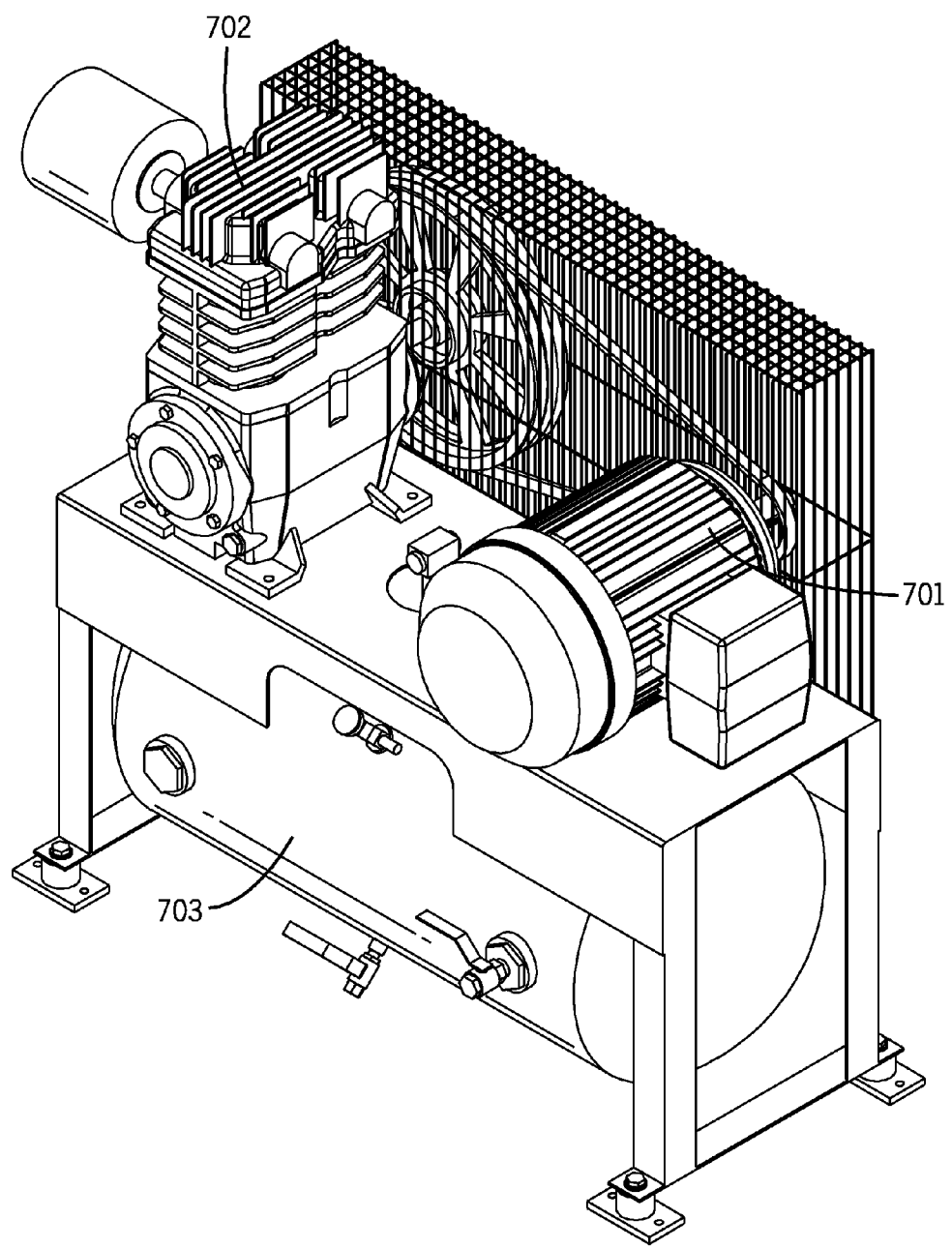
FIG. 7 is a perspective view of an embodiment of the compressed air source of the system for initiating flow of bulk materials in containment vessels.

FIG. 7 discloses a compressed air system that includes a motor 701, which may include an electric motor, an air compressor 702, and an air reservoir 703. Those of skill in the art will appreciate that equivalent compressed air systems may be employed to accomplish the objectives of the system disclosed herein.

Figure 8:
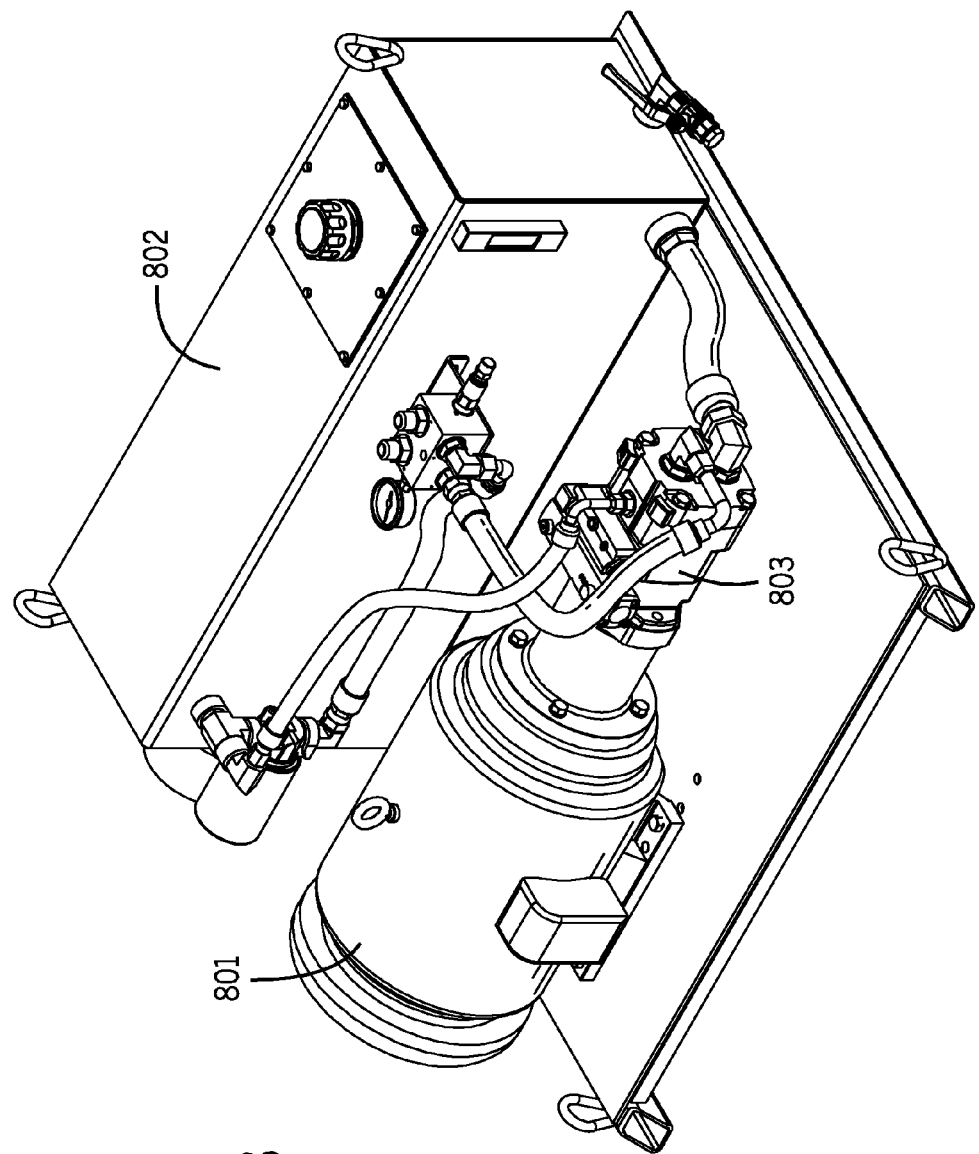
FIG. 8 is a perspective view of an embodiment of the hydraulic fluid source of the system for initiating flow of bulk materials in containment vessels.

FIG. 8 discloses a hydraulic fluid system comprising electric motor 801, fluid reservoir 802, and pump 803, which supplies hydraulic fluid to cylinders 102. In a preferred embodiment, the system uses vegetable oil as the hydraulic fluid. Those of skill in the art will appreciate that equivalent hydraulic fluid systems may be employed to accomplish the objectives of the system disclosed herein.

By way of further non-limiting example only, the system can be temporarily or permanently mounted, so long as the hydraulically-powered boom arm can be maneuvered and positioned over the containment vessel or railcar. By way of non-limiting example only, the system may be mounted to a mobile material lift vehicle. Those of skill in the art will appreciate that many platforms may be suitable to mount the system disclosed herein.

It is to be understood that the above description is intended to be illustrative and not restrictive. For example, the above-described embodiments and variations may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of using a system for accurate placement of a compressed air blast point to initiate flow of bulk particulate material in a containment vessel comprising the steps of:
   a. providing a compressed air system comprising a motor, an air compressor, and an air reservoir;
   b. providing a hydraulic fluid system comprising a motor, a hydraulic fluid reservoir, and a pump;
   c. providing a slew drive rotatable to about 20° of each side of vertical;
   d. providing a hydraulically-powered, articulating boom arm comprising hydraulic cylinders, in which said hydraulic cylinders remain in a plane parallel to the boom arm throughout operation of the system;
   e. providing a blaster assembly with first and second ends comprising an air reservoir proximate the first end, a mount assembly, a discharge tube assembly, and a discharge tip assembly further comprising a shooting valve proximate the second end;
   f. providing a wireless control system with an effective range of about 50 feet and capable of controlling the compressed air and hydraulic fluid systems to further control the hydraulic cylinders of the boom arm, the slew drive, and the blaster assembly;
   g. positioning the discharge tip assembly at a desired location in the containment vessel;
   h. charging the blaster assembly with compressed air; and i. triggering the release of the compressed air from the blaster assembly into or onto the bulk material to fluidize and initiate flow of the bulk material.

2. A system for accurate placement of a compressed air blast point to initiate flow of bulk particulate material in a containment vessel comprising:
   a. a compressed air system comprising a motor, an air compressor, and an air reservoir;
   b. a hydraulic fluid system comprising a motor, a hydraulic fluid reservoir, and a pump;
   c. a slew drive rotatable to about 20° of each side of vertical;
   d. a hydraulically-powered, articulating boom arm comprising hydraulic cylinders, in which said hydraulic cylinders remain in a plane parallel to the boom arm throughout operation of the system;
   e. a blaster assembly with first and second ends comprising an air reservoir proximate the first end, a mount assembly, a discharge tube assembly, and a discharge tip assembly further comprising a shooting valve proximate the second end; and
   f. a wireless control system.

3. The system of claim 2, wherein the containment vessel includes at least one gravity discharge gate.

4. The system of claim 3, wherein the containment vessel includes a hopper railcar with a plurality of gravity discharge gates.

5. The system of claim 2, wherein the motor of the compressed air system includes an electric motor.

6. The system of claim 2, wherein the motor of the hydraulic fluid system includes an electric motor.

7. The system of claim 2, wherein the hydraulic fluid comprises vegetable oil.

8. The system of claim 2, wherein the slew drive at maximum rotation provides the discharge assembly tip a maximum movement of about 40 degrees.

9. The system of claim 2, wherein the discharge tip can be positioned at a point about 20 feet higher than the relative position of the bottom of the slew drive and about 15 feet lower than the relative position of the bottom of the slew drive.

10. The system of claim 2, wherein the hydraulically-powered, articulating boom arm is lengthwise extendable from about 8 feet from the slew drive to about 28 feet from the slew drive.

11. The system of claim 2, wherein the air pressure blast from the discharge assembly tip can regulated between about 80 psi to 150 psi.

12. The system of claim 2, wherein the discharge tube assembly comprises powder-coated steel.

13. The system of claim 2, wherein the wireless control system has an effective range of about 50 feet and is configured to independently articulate the slew drive, the blaster assembly, and the charge and discharge of compressed air from the shooting valve.

14. The system of claim 2, wherein the boom arm is permanently mounted.

15. The system of claim 2, wherein the boom arm is temporarily mounted.

16. The system of claim 2, wherein bulk particulate material includes material selected from the group consisting of dried distiller's grains, soybean meal, corn meal, gluten meal, blood meal, plastic, coal, salt, sugar, flour, silica, corn, wheat, soybeans, wheat middlings, feed, minerals, fertilizer, and gypsum.

* * * * *